United States Patent

Chatta et al.

[11] Patent Number: 6,103,207
[45] Date of Patent: Aug. 15, 2000

[54] TREATING DIESEL EXHAUST WITH A CATALYTIC PARTICULATE MIXTURE

[75] Inventors: Mohinder S. Chattha, Northville; Robert J. Kudla, Warren, both of Mich.

[73] Assignee: Ford Global Technologies, Inc., Dearborn, Mich.

[21] Appl. No.: 09/298,860

[22] Filed: Apr. 26, 1999

[51] Int. Cl.[7] .................................................. B01D 53/94
[52] U.S. Cl. .................................. 423/213.2; 423/213.5; 423/239.1; 423/245.3; 423/247
[58] Field of Search .............................. 423/213.2, 213.5, 423/239.1, 245.3, 247, 212 C

[56] References Cited

U.S. PATENT DOCUMENTS

| | | | |
|---|---|---|---|
| 3,860,535 | 1/1975 | Johnson | 252/472 |
| 3,931,050 | 1/1976 | Asano et al. | 252/462 |
| 4,299,734 | 11/1981 | Fujitani et al. | 252/462 |
| 5,399,324 | 3/1995 | Subramanian et al. | 423/213.7 |
| 5,516,741 | 5/1996 | Gascoyne et al. | 502/230 |
| 5,677,258 | 10/1997 | Kurokawa et al. | 502/303 |
| 5,753,192 | 5/1998 | Dobson et al. | 422/177 |

FOREIGN PATENT DOCUMENTS 50-5271  1/1975  Japan ................................ 423/212 C

*Primary Examiner*—Steven P. Griffin
*Assistant Examiner*—Timothy C. Vanoy
*Attorney, Agent, or Firm*—Lorraine S. Melotik

[57] ABSTRACT

A method is provided for treating diesel engine exhaust gas with a catalyst containing a physical mixture of particles. The catalyst contains a physical mixture of particles of (i) a bi-metal oxide of manganese and zirconium and (ii) a precious metal, such as platinum, supported on an alumina, such as gamma alumina.

8 Claims, 1 Drawing Sheet

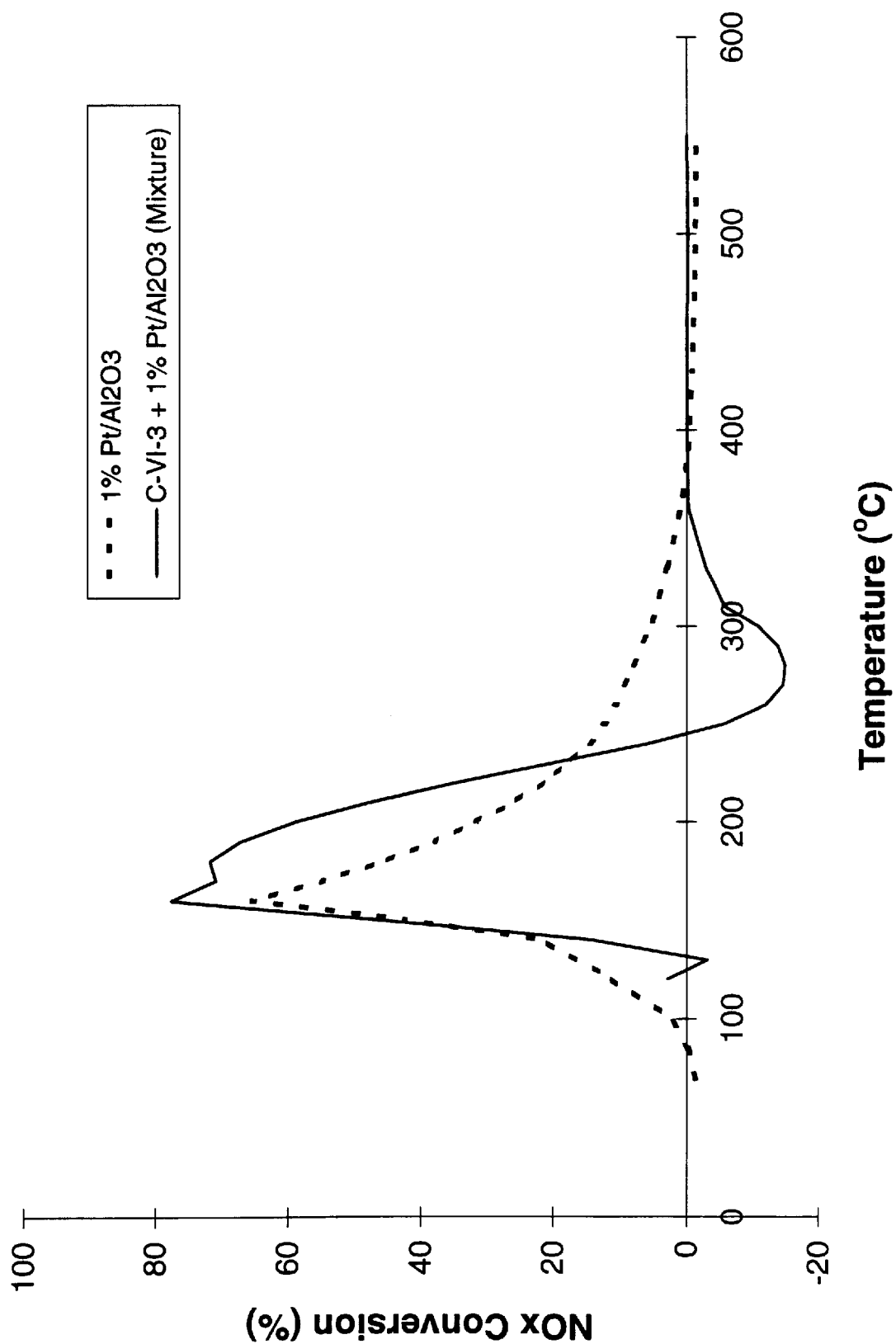

TREATING DIESEL EXHAUST WITH A CATALYTIC PARTICULATE MIXTURE

FIELD OF THE INVENTION

The invention is directed to a catalyst useful to reduce nitrogen oxides in an oxidizing atmosphere during diesel engine operation. The catalyst comprises a mixture of two different kind of particles: 1) platinum supported on alumina and 2) a bi-metal oxide of manganese and zirconium.

BACKGROUND OF THE INVENTION

Catalysts are employed in the exhaust systems of automotive vehicles to convert carbon monoxide, hydrocarbons, and nitrogen oxides (NOx) produced during engine operation into nonpolluting gases. When the gasoline powered engine is operated in a stoichiometric or slightly rich air/fuel ratio, i.e., between about 14.7 and 14.4, catalysts containing precious metals like palladium and rhodium are able to efficiently convert all three gases simultaneously. Hence, such catalysts are often called "three-way" catalysts.

Engines operating on diesel fuel are commonly used in Europe and are known for their enhanced fuel economy relative to gasoline engines. Diesel engines operate under oxygen-rich (often termed: lean-burn) conditions where the A/F ratio is greater than 19, generally 19–40 and under relatively cool operating temperatures as compared to gasoline engines. Three-way catalysts developed for treatment of exhaust gas from conventional gasoline engine operation under stoichiometric A/F ratios are less than desirable for diesel exhaust gas treatment. Such catalysts are able to convert carbon monoxide and hydrocarbons in lean-burn operation but are not efficient in the reduction of NOx ($NO+NO_2$) during diesel operation due to the lower temperature and excess oxygen. The desire for efficient diesel catalysts to meet European upcoming diesel emission standards continues to prompt research. Due to the nature of diesel engine exhaust, these catalysts must be able to reduce NOx at relatively low temperatures in an oxygen rich environment.

Available diesel catalysts are often based on zeolite materials containing a precious metal like platinum which can have major drawbacks. Among the most important are a narrow temperature range of operation and loss of activity (and sometimes physical integrity) under the hydrothermal conditions of automotive exhaust gases. For example, a platinum catalyst is generally only active at a relatively low temperature, i.e., less than 250° C. At higher temperatures the competitive oxidation of the reductant hydrocarbon molecules by oxygen is so fast that the removal of NOx drops off precipitously with rising temperature so as to make such catalyst inadequate for treating somewhat hotter exhaust streams. On the other hand, a different type of catalyst where the active sites are transition metal ions exchanged into the cationic sites of the zeolite, the onset of selective catalyst reduction activity begins at temperatures greater than 400° C. This renders the ion-exchanged catalyst inactive for catalysis during a large portion of the desired temperature range. Other diesel catalysts are based on support materials such as silica, gamma-alumina, titanium oxide, zirconium oxide or some combination thereof. These catalysts have the drawback, however, that they either have rather low NOx conversion efficiencies or have narrow NOx conversion temperature windows.

As discussed above, platinum impregnated alumina materials are considered viable candidates for the aftertreatment of diesel exhaust at low temperatures. Such catalysts act to reduce the NOx through the use of hydrocarbons over a catalyst, the hydrocarbons being in turn oxidized. However, such catalysts typically have a rather narrow NOx conversion temperature window. We have now unexpectedly found that a catalyst which is a physical mixture of manganese/zirconium oxide with platinum/alumina provides a wider NOx conversion window in the low temperature region. In U.S. application Ser. No. 09/134,992 filed Aug. 17, 1998 commonly assigned herewith, a NOx trap catalyst for lean-burn engines is disclosed. It comprises platinum with a tri-metal oxide of aluminum oxide, manganese oxide, and zirconium oxide made by sol-gel techniques.

DISCLOSURE OF THE INVENTION

The invention is a method and catalyst useful for treating diesel engine exhaust gas. The catalyst comprises a mixture of particles comprising: (i) a bi-metal oxide of manganese (Mn) and zirconium (Zr) where the Mn:Zr atomic ratio is from 3:1 to 1:3; and (ii) at least 0.25 wt. % precious metal supported on alumina. The precious metal comprises at least platinum and may further include rhodium and/or palladium. In the catalyst mixture, the bi-metal oxide particles comprise 25 to 65 wt. %. The method comprises locating the disclosed catalyst in the exhaust gas passage of a diesel engine and exposing the diesel exhaust gases to the catalyst.

BRIEF DESCRIPTION OF THE DRAWINGS

FIG. 1 is a graph which shows NOx conversion as a function of catalyst temperature for a present invention embodiment catalyst (solid line) which is a mixture of Mn—Zr oxide with 1% Pt/γ-alumina and a comparative 1% Pt/γ-alumina catalyst (dashed line).

DETAILED DESCRIPTION OF PREFERRED EMBODIMENTS

The catalyst disclosed above is useful for treating diesel internal combustion engine exhaust gases. As is known, the A/F ratio of the diesel engine is oxidizing and generally greater than 19, most often, 19–40. The temperature of diesel exhaust is relatively cool compared to that produced by gasoline vehicles, being generally 150° C. to 600° C. The present invention catalyst is particularly useful for diesel applications because it has shown improved NOx conversion activity at broadened low temperatures as compared to conventional precious metal only catalysts.

The present invention catalyst is a mixture of two different particles which may be in a powder form, for example washcoated on a substrate, or pelleted solid form. The first particle required in the mixture is a bi-metal oxide of manganese (Mn) and zirconium (Zr) and the second particle has a precious metal, being at least platinum, supported on alumina. Each of these particles will be discussed in detail below.

The bi-metal oxide particles of manganese and zirconium contain manganese (Mn) and zirconium (Zr) in an atomic ratio of between 3:1 to 1:3 Mn:Zr. More preferably this ratio is 2:1 to 1:2, optimally being about 1:1. The mixed Mn—Zr oxide particles may be made, for example, by coprecipitation from a solution which contains a mixture of soluble manganese and zirconia precursor materials. That is, in concentrations to provide the Mn:Zr atomic ratios disclosed above as would be apparent to one skilled in the art in view of the present disclosure. One preferred way to make this mixed oxide is from nitrates of manganese and zirconium because of their high water solubility. A solution of these nitrates is formed and then ammonia is added which causes the precipitation of the Mn—Zr metal oxide product. This oxide precipitate has zirconium atoms and manganese atoms in mixture in the crystal lattice of the oxide, such that the Zr and Mn metal atoms may be attached to the same oxygen. Thus, the invention zirconium-manganese oxide as present in the invention catalysts is not a mere mixture of separate particles of manganese oxide and zirconium oxide but rather is a single oxide particle which has both metals incorporated within. This provides atomic proximity of these metals which is believed to be a significant factor in the improved NOx conversion of the invention catalyst.

The Mn—Zr oxide of the catalyst formulation provides an advantage in low temperature NOx removal from diesel exhaust. It is believed that the Mn—Zr mixed oxide stores oxidized nitrogen monoxide as a nitrate species at low exhaust temperatures. Upon increased catalyst temperature, the stored NOx is released from the Mn—Zr oxide and is catalytically reduced over the precious metal in the catalyst through the use of reductants like hydrocarbons, CO, and $H_2$ present in the diesel exhaust gas. The noble metal based catalyst thus needs to be in close physical contact to the Mn—Zr oxide to allow this reduction reaction to take place. Another benefit of this type of catalyst system is that the stored NOx is released thermally. In contrast, a catalyst system involving a conventional lean-NOx trap requires the engine to have brief excursions that are rich of stoichiometric operation in order to release the absorbed NOx resulting in a fuel economy penalty. These conventional lean-NOx traps generally include barium to absorb the NOx and platinum to reduce the released NOx. Neither the validity nor understanding of this theory is necessary for the practice of this invention. It is provided by way of explanation of the improved NOx removal afforded by the present invention catalyst.

Another particle component of the mixture is precious metal supported on a porous alumina support. This precious metal on alumina includes at least 0.25 wt. % platinum/alumina. More preferably the platinum is about 0.25 to about 2 wt. % based on the alumina support. The precious metal may include, in addition to platinum, other precious metal consisting of palladium and/or rhodium. Rhodium, when included, is preferably added in relatively small amounts, optimally 0.01–0.2 wt. % based on the weight of the support. Rhodium is desirably included since it provides a broadening of the NOx conversion window due to increased conversion efficiency of nitrogen oxides at higher temperatures. As disclosed above, the support material for the precious metal comprises alumina, generally being gamma-alumina ($\gamma$-alumina),but may include stabilizers or other materials in minor proportions such as, but not limited to, lanthanum oxide, cerium oxide, titanium dioxide, silicon dioxide, and alpha-alumina.

The precious metal may be provided on the alumina porous support by any technique including the well known wet impregnation technique from soluble precious metal compounds. Water soluble compounds are preferred, including, but not limited to nitrate salts. In addition to this incorporation from a liquid phase, the precious metal, such as the platinum, may be provided by sublimation of platinum chloride or other volatile platinum salts: by solid state exchange in the 300–500° C. temperature range using labile platinum compounds.

In the catalyst particle mixture, the bi-metal oxide is 25 to 65 weight percent, preferably being 35–60 wt. %, more preferably being 40–55 wt. % of the mixture. The particle size of the catalyst materials in this mixture is not critical to the invention. However, for optimal catalytic efficiency, the particle size preferably is, on average, less than about 15 microns, more preferably being 0.1 to 10 microns, and most desirably being about 1 to 5 microns. This is especially the case when the particle mixture is washcoated on a substrate. Washcoating of the particle mixture on a substrate would be well within the skill of one in the art in view of the present disclosure.

As is known in the art, for useful application of the catalyst in an exhaust system, the catalyst will be deposited or washcoated on a substrate (mechanical carrier) made of a high temperature stable, electrically insulating material such as cordierite, mullite, etc. A mechanical carrier is preferably comprised of a monolithic magnesium aluminum silicate structure (i.e., cordierite), although the configuration is not critical to the catalyst of this invention. It is preferred that the surface area of the monolithic structure provide 50–1000 meter square per liter structure, as measured by $N_2$ adsorption. Cell density should be maximized consistent with pressure drop limitations and is preferably in the range of 200–800 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

If the catalyst is to be applied to the substrate, rather than being used in pellet form, each powder catalyst may be made into a slurry with liquid, usually water, mixed together by ball milling, and then coated on the substrate followed by drying. Applying the powders described above onto a monolith substrate should result desirably in a loading of platinum and Mn—Zr bi-metal oxide in total of 0.05–1.4 wt. % and 5–25 wt. % respectively, on a finished substrate (based on the weight of the substrate).

EXAMPLE 1

This example describes preparation of catalyst useful to treat diesel exhaust gases according to an embodiment of the present invention. To make the bi-metal oxide particle, zirconium dinitrate oxide, 22 g, is dissolved in 600 ml distilled water at 60° C. to which 34 g of 5% manganese nitrate solution is added. The solution reaction mixture is cooled to room temperature and ammonia is added to form the hydroxide (pH=10). The reaction mixture is allowed to stay at room temperature overnight and then filtered. The resulting Mn—Zr metal oxide product is dried at 110° C. overnight and calcined at 500° C. for 4 hours. The bi-metal oxide product comprises Mn:Zr in an atomic ratio of 1:1. To make the second particle, gamma-alumina particles (20–40 mesh) are contacted with chloroplatinic acid solution to deposit, by incipient wetness, 1% Pt by weight on alumina. The precious metal material is kept at room temperature overnight, dried at 105° C. for one hour, and then calcined at 500° C. for four hours. The two powder materials, of which 60% by weight comprises Mn—Zr metal oxide, are then mixed together by ball milling. This powder is then subjected to testing as follows.

Reaction Analysis

To test the NOx removal efficiency of the catalysts of the examples disclosed herein, they are placed in a quartz flow reactor and characterized under diesel exhaust conditions. Gases are blended to form a simulated diesel exhaust gas in a manifold by means of mass flow controllers. The gases flow through the reactor and the post-catalyst gases later flow to an analytical train to determine the extent of reactions on various components of the gas, especially the NOx, as a function of temperature. The diesel simulated feed gas composition is $C_3H_6$, 933 ppm; CO, 735 ppm; $H_2$, 245 ppm; NOx, 350 ppm; $O_2$, 14.0%; $SO_2$, 20 ppm; $CO_2$, 5%, $H_2O$, 4.6%; $N_2$, balance, with the gas at a space velocity (25,000 $h^{-1}$) and the temperature ramp rate is 15° C./min.

As seen in FIG. 1, the maximum NOx conversion for the physical mixture catalyst of example 1 is 77.7% at 175° C. The highest NOx conversion of a comparative typical diesel catalyst, which includes 1% $Pt/Al_2O_3$ without any of the bi-metal invention oxide, is 74%. In addition, and very importantly, the 50% NOx conversion window for conventional diesel catalyst: 1% $Pt/Al_2O_3$ is from 153–175° C., whereas for the invention embodiment catalyst: Mn—Zr oxide with 1% $Pt/Al_2O_3$ mixture it is from 151–208° C. Hence, the present invention catalyst is effective for NOx conversion over a significantly higher temperature range than the platinum only conventional catalyst.

EXAMPLE 2

An embodiment of the invention catalyst is prepared and evaluated as described in Example 1 except that 11 g of zirconium dinitrate oxide is employed in the preparation of the manganese-zirconium mixed oxide. This results in a 2:1 atomic ratio of Mn:Zr. The maximum NOx conversion is 75% with 50% NOx conversion from 150 to 196° C.

EXAMPLE 3

The experiment described in Example 1 is repeated by employing a 0.5 wt. % Pt catalyst in making a present invention embodiment formulation. The maximum NOx conversion is 69% at 215° C.

EXAMPLE 4

The experiment is carried out as described in Example 1, except that 0.10 wt. % Rh is included in the gamma-alumina catalyst composition. The maximum NOx conversion is 78% with a 50% NOx conversion temperature window from 151 to 214° C.

EXAMPLE 5

The preparation is carried out as described in Example 1 except that 12 g of 5% manganese nitrate solution was added, resulting in a 1:3 atomic ratio of Mn:Zr in the bi-metal oxide. The catalyst is evaluated as described in Example 1 and provides 74% NOx conversion. The 50% NOx conversion temperature window is from 151 to 186° C.

EXAMPLE 6

Lanthanum oxide (5% by wt.) is deposited on the gamma-alumina support material by employing a lanthanum nitrate solution of desired concentration. The resulting sample is dried and calcined at 500° C. for 4 hours before the addition of 1 wt. % Pt as specified in Example 1. Catalyst evaluation of the physical mixture as described in Example 1 provides 77% NOx conversion.

EXAMPLE 7

Titania (3% by wt.) is deposited on the precious metal based catalyst sample of Example 1. The catalyst evaluation, as described in Example 1, provides 75% maximum NOx conversion.

EXAMPLE 8

The experiment is carried out as described in Example 1, except that 1.4% Pt, 0.05% Rh, and 0.2% Pd is included in the gamma-alumina catalyst composition. The maximum NOx conversion is 79% with a 50% NOx conversion temperature window from 145 to 212° C.

EXAMPLE 9

The catalyst is prepared and evaluated as described in Example 1 except that the Mn—Zr metal oxide comprises 30 wt. % of the catalyst particle mixture. The NOx conversion is 76% with 50% NOx conversion from 151 to 192° C.

We claim:

1. A method for treating diesel engine exhaust gases containing hydrocarbons, carbon monoxide and nitrogen oxides, comprising:

passing the diesel engine exhaust gases through a catalyst, wherein the catalyst comprises a physical mixture of particles of:

(a) a bi-metal oxide of manganese and zirconium, wherein the atomic ratio of manganese to zirconium is from 3:1 to 1:3; and (b) precious metal comprising platinum supported on alumina, wherein the platinum is present in an amount of at least 0.25 weight percent based on the alumina; and wherein the bi-metal oxide particles comprise 25 to 65 weight percent of the catalyst mixture.

2. The method of claim 1, wherein the bi-metal oxide particles comprise 35 to 60 weight percent of the mixture.

3. The method of claim 1, wherein said alumina is gamma alumina.

4. The method of claim 1, wherein the bi-metal oxide contains manganese and zirconium in a manganese:zirconium atomic ratio of 2:1 to 1:2.

5. The method of claim 1, wherein the particles have an average diameter of less than 15 microns.

6. The method of claim 5, wherein the particles have an average diameter of 0.1 to 10 microns.

7. The method of claim 1, wherein the precious metal further comprises rhodium and/or palladium.

8. The method of claim 1, wherein the alumina further comprises at least one stabilizer selected from the group consisting of lanthanum oxide, cerium oxide, titanium oxide, silicon dioxide and alpha alumina.

* * * * *